Inventor:
Josef Fröhlich

United States Patent Office 3,442,535
Patented May 6, 1969

3,442,535
RAPID-ACTION COUPLING FOR OIL
TRANSFER APPARATUS
Josef Fröhlich, Dusseldorf, Germany, assignor to Mannesmann Aktiengesellschaft, Dusseldorf, Germany, a corporation of Germany
Filed Nov. 8, 1966, Ser. No. 592,906
Int. Cl. F16l 35/00, 39/00, 55/00
U.S. Cl. 285—27                                   7 Claims

ABSTRACT OF THE DISCLOSURE

A rapid-action coupling that includes a mouthpiece of elbow shape and claws displaceable by a displacing device. A pin is connected to the mouthpiece for each claw, and each claw is movable about the pin. The pin engages an aperture of each claw, and each claw is displaceable relative to the pin, against the bias of a spring arranged on the claw in response to the movement of a connecting rod that is in driven connection with a cross head of the aforesaid displacing device.

---

The invention relates to a device for the rapid connection and separation of the mouthpiece of a transfer apparatus to or from the connecting nozzle of a tankship or the like. For the loading and discharging of tankships, use has for some time been made of transfer apparatus which are arranged on the quay installations and which are provided with a pivotal tube jib that is connected at its end (the mouthpiece) with the ship's connecting nozzle. Devices are already known which are secured to the mouthpiece of the transfer apparatus and which permit a rapid-action connection. These arrangements, however, have the drawback that in the case of a mishap, they cannot be released sufficiently rapidly, so that a predetermined breaking point must be provided.

It is accordingly a principal object of the invention to provide a rapid-action coupling for transfer installations which can be manufactured both in a manually-operable form and also in an hydraulically operable form and which has only one working cylinder or one hand lever designed to act simultaneously on all the clamping stirrups. It is a further object of the invention to replace the multipart clamping stirrup of the prior art by a single-part clamping claw.

Thus, according to an embodiment of the invention a device is provided for the rapid connection and separation of the mouthpiece of a transfer apparatus and of the connecting nozzle of a tankship or the like.

The displacement device may, fundamentally, have any desired form provided that it is suitable for the purpose, since its effect is merely to produce a linear movement of a cross head and is required to exert a force thereon; however, a design incorporating an eccentric-like cam disc displaced manually on the cross head against the action of a restoring spring is especially advantageous, above all for smaller nominal widths (nominal diameters). It is sufficient to effect an approximately 180° rotation of the cam disc, by means of a head lever secured to the cam disc shaft, externally of the housing, in order to actuate the device.

For larger nominal diameters, an hydraulic displacing device, which is especially advantageous by comparison with known designs in the forms described in the following text, will generally be preferred. In the case of one of the designs according to the invention, the hydraulic displacement device comprises a lever, a hydraulic working cylinder the foot of which is secured to the cross head whereas its piston-rod end is secured in an articulated manner to the longer arm of said lever. The lever is mounted for pivoting about a housing pin secured on the housing and its other arm presses, by means of a pressure roller, on a plate secured on the guide cage of the cross head.

By this means, the result is attained that a multiple of the pressure force of the hydraulic cylinder becomes effective on the cross head, as soon as the clamping claws bear against the connecting flange of the tankship or the like.

In the case of a further preferred embodiment of the rapid-action coupling, the part of the cylindrical housing remote from the tube elbow is designed as an hydraulic cylinder and receives a corresponding piston. The cross head is hinged to the piston rod, preferably by means of a ball joint.

This technically simple solution permits the provision of large pressing-on forces, since the piston is able to occupy the entire free cross-section of the housing designed as a cylinder, so that a large pressing surface is available. The "wobbling" mounting of the cross-section by means of the ball joint has the effect that all the clamping claws are fully effective even in the case of uneven portions on the connecting flange.

The hydraulic unit may be fitted directly on the cylinder, so that it only remains to guide the electrical current leads to the device.

Furthermore, the cavity between the cylinder and the tube elbow may be used as a storage container for the hydraulic liquid.

A plurality of embodiments of the invention is illustrated in the figures, wherein.

Figure 1:
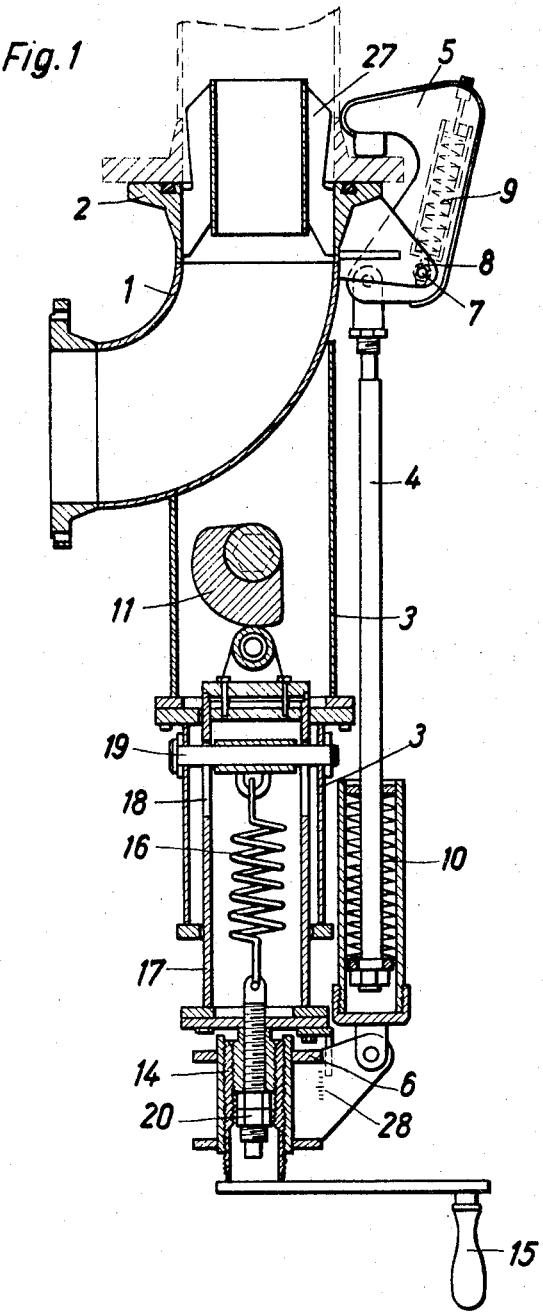
FIG. 1 is a fragmentary sectional view of a rapid-action coupling having a mechanical displacement device, with closed clamping claws.

Fitted on an elbow 1 which terminates in a flange 2 and through which conveying medium, for example petroleum or natural gas, flows during the transfer procedure, is a substantially cylindrical housing 3. The housing is, in the embodiment according to FIG. 1, sub-divided and designed with the smaller diameter at the end thereof remote from the mouthpiece. A guide cage 17 which is fast with a cross head 6 is guided in the housing 3 and is there displaced, by means of a cam disc 11 against the bias of a recall or retraction spring 16. The cam disc 11 could also be provided with a slide-like guide for the roller travelling on its periphery, in which case the recall spring 16 may be dispensed with. The recall spring 16 which is secured on the cross head 6 and, via a pin 19, on the tapered portion of the housing 3, the pin 19 penetrating through a longitudinal recess 18 formed in the guide cage 17, may be adjusted by adjusting or tightening nuts 20. Secured in articulated manner to the cross head 6, with interposition of resilient members 10, are preferably three connecting rods 4. At their other end, the connecting rods 4 are connected in articulated manner with one clamping claw 5 in each case. The clamping claw 5 is arranged for pivoting about a pin 7, the pin 7 engaging in an elongated aperture 8 formed in the clamping claws 5. A spring 9 produces, during the opening and closing of the device, a displacement of the elongated aperture 8 relatively to the pin 7 and therewith the temporally correct development of movement of the clamping claw 5. In this case, the connection between the cross head 6 and the guide cage 17 is provided by means of a differential spindle 14. By rotating a crank 15, the differential spindle 14 is actuated and the spacing between the cross head and the cam disc can be varied, thus permitting adjustment to varying flange thicknesses. For this purpose there is also an indicator device having a scale 28. On the mouthpiece can be seen a centering device 27 permitting rapid engagement and centering of the connecting nozzle.

Figure 2:
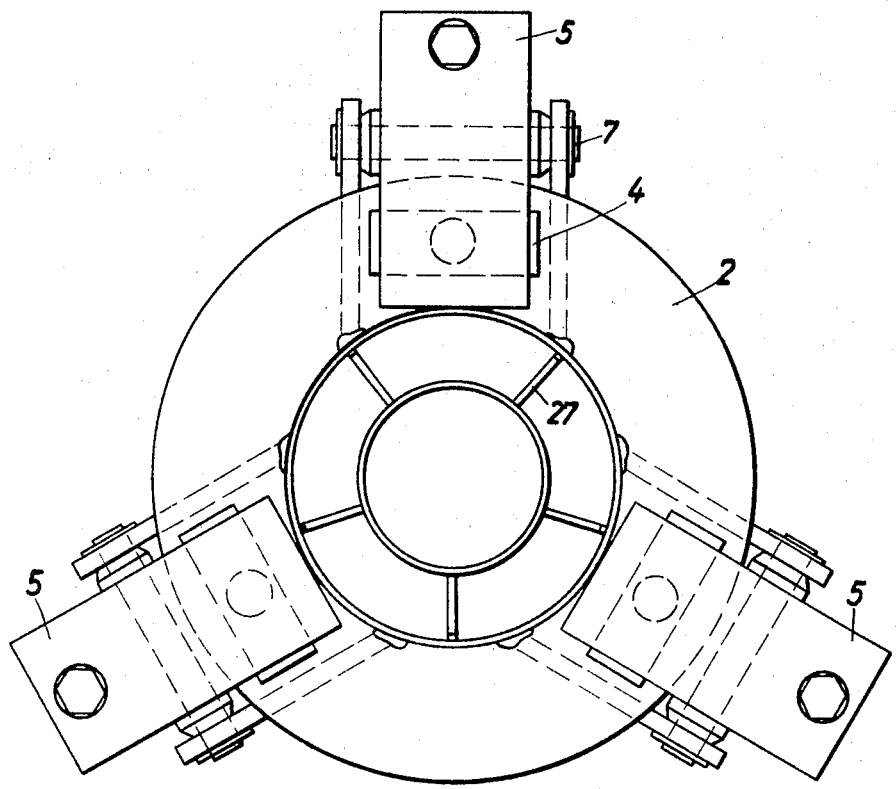
FIG. 2 is an elevational view seen in the direction towards the mouth flange of the rapid-action coupling according to the FIG. 1.
Figure 3:
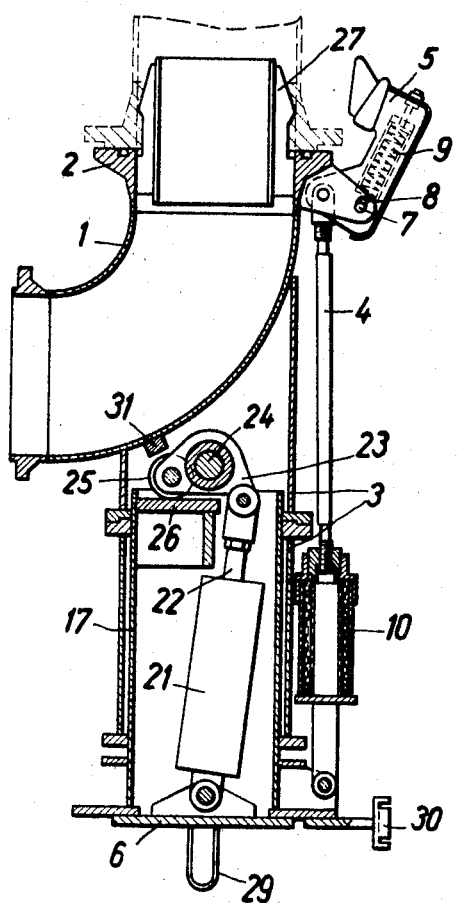
FIG. 3 is a sectional view similar to FIG. 1 but embodies a modification and shows an hydraulically actuated rapid-action coupling having an hydraulic cylinder arranged in the interior of a housing.

FIG. 2 shows the clamping claws 5, which are distributed uniformly over the periphery, in a position corresponding to that shown in FIG. 1.

Where as the rapid-action couplings mechanically actuated by hand are used predominently for smaller pipe widths, in the case of large nominal diameters, it is advisable to use an hydraulically actuated device, such as is illustrated in the example of embodiment according to FIG. 3. The cross head 6, to which the connecting rods 4 are secured with interposition of resilient members 10, is in this case also prolonged by means of a guide cage 17 guided in the housing 3. Arranged unilaterally at the end of the guide cage 1 is a pressure plate 26.

Disposed in the interior of the guide cage is an hydraulic working cylinder 21 the foot of which is secured in articulated manner to the cross head 6. Associated with the cylinder 21 is a piston rod 22. The head of the piston rod 22 is connected, again in articulated manner, to the longer arm of a lever 23 which is pivotal about a housing pin 24 secured in the housing 3. The shorter, free arm of the lever 23 is supported, when the piston rod 22 is extended, on the pressure plate 26, via a roller 25. On release of the coupling, the lever 23 swings back, under the influence of the working cylinder, and bears against a locking means 31.

If there is also secured on the housing pin 24 a hand lever which is not shown in FIG. 3, the housing pin 24 and the lever 23 must be rigidly connected together.

The pressure pipes for the hydraulic cylinder have not been included in the drawings, for the sake of clarity. As an auxiliary means, however, a handle 29 and a support 30 are indicated. The support 30 may for example be for supporting the jib of the transfer apparatus, which said jib is perse arranged in cantilever fashion, in the inoperative position.

Figure 4:
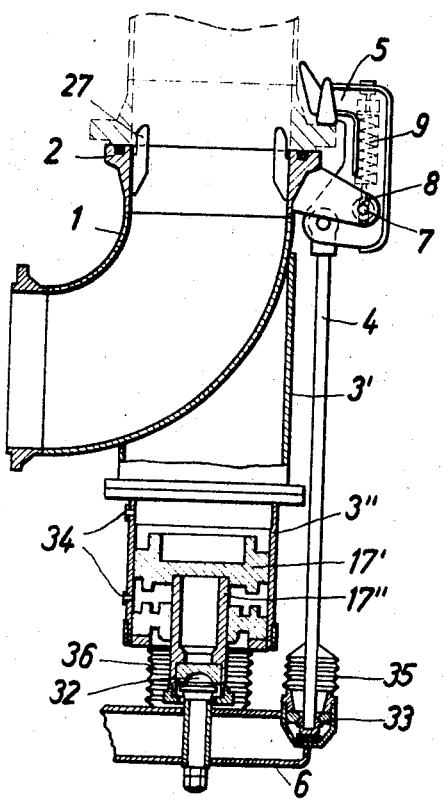
FIG. 4 is a fragmentary sectional view that shows an hydraulically actuated rapid-action coupling, wherein the cross head is mounting in wobbling manner.
Figure 5:
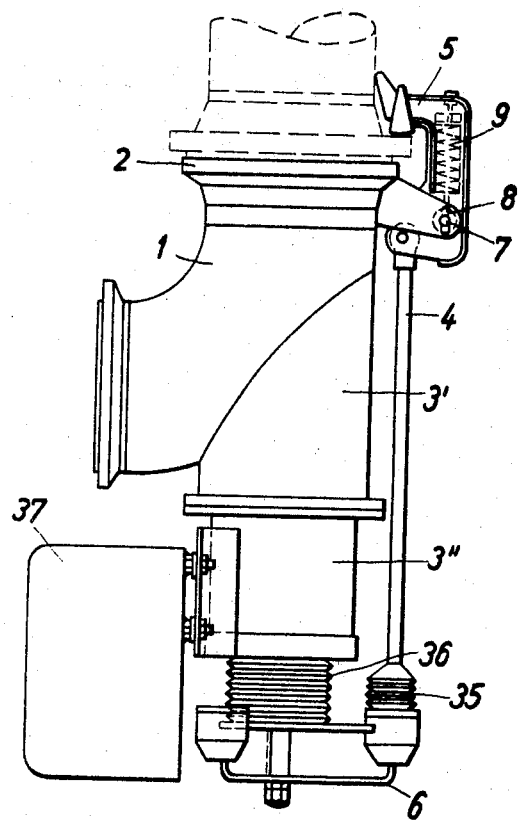
FIG. 5 is an elevational view of the rapid-action coupling according to FIG. 4.

In the case of the preferred embodiments of the invention shown in FIGS. 4 and 5, the housing 3 is subdivided and forms the hollow member 3' and the cylinder 3". Guided in the cylinder 3" is a piston 17' and a corresponding piston rod 17". The hydraulic liquid is fed-in via apertures 34 in the cylinder 5". The piston rod 17" is connected, via a ball joint 32, with the cross head 6. The connecting rods 4 are secured to the cross head, with articulated connections 33. A sleeve 35 serves for protecting the articulated connection 33 a bellows 36 for protecting the ball joint 32.

FIG. 5 shows an hydraulic unit 37 supplying the pressure liquid for the hydraulic cylinder.

The hollow member 3' between the tubular member 1" and the cylinder 3" may serve as a storage container for the hydraulic liquid.

I claim:

1. Device for the rapid connection and separation of the tubular mouthpiece of a transfer installation and a connecting nozzle including a connecting flange, the mouthpiece including a mouth flange (2), said mouthpiece having substantially the shape of a 90° pipe elbow (1) and hook-like clamping claws (5) distributed uniformly over the periphery of said mouth flange and engaging over and against the connecting flange thereby clampingly engaging and maintaining said flanges together and sealing means located between and sealingly engaging said flanges, a displacement device for each claw including a connecting rod (4) and a cross head (6) in driven connection therewith, and means connecting said rods to said claws, each said claw arranged on the mouthpiece by means of a pin (7) mounted on said mouthpiece, a spring (9) on each claw, each clamping claw is mounted for pivoting about said pin (7) which, has predetermined spacing from the mouth flange (2) and the periphery of the elbow (1), the pin engaging in an elongated aperture (8) formed in the clamping claw (5), said spring being mounted in each claw substantially parallel to the major axis of said elongated aperture, the clamping claw (5) being displaceable relative to the pin (7) in the direction of said major axis, against the pressure of said spring (9) arranged on the claw in response to the movement of said connecting rod (4) in each case, the connecting rods (4) being connected in articulated fashion at their other end to the cross head (6) of the displacement device, and means to move said cross head relative to said mouthpiece and thereby move said claws into and out of said clamping engagement, and a casing arranged on the rear side of the elbow (1) at least partially housing said displacement device.

2. Device according to claim 1, characterized in that said means to move said cross head consists substantially of a cam disc (11) which is mounted in the housing (3) and which is rotatable from the exterior of said housing, and of a recall spring (16) secured on the cross head (6) and on the housing (3) maintaining said cross head in constant contact with said cam disc whereby pivoting of the cam disc produces a displacement of the cross head relative to said mouth flange.

3. Device according to claim 1, characterized in that resilient members (10) are arranged on the connecting rods, said resilient member providing a resilient connection between said connecting rod and said cross head.

4. Device according to claim 1, wherein said means to move said cross head include a hydraulic means characterized in that a guide cage (17) is telescopically arranged within said casing and a hydraulic working cylinder is arranged within said guide cage (17), the foot of the cylinder (21) being secured in articulated manner on the cross head (6) and the piston rod (22) being secured in articulated manner on the arm of a lever (23) which is mounted for pivoting about a housing pin (24) secured in the housing (3), the other arm of the lever (23) acting, when the jaws are moved out of clamping engagement, on a pressure plate (26) which is connected to the cross head (6), via the guide cage (17), and bearing against a locking means (31) on said mouthpiece when the jaws are moved into clamping engagement.

5. Device according to claim 1, characterized in that said means to move said cross head includes a hydraulic cylinder (3") which receives a corresponding piston (17') which in turn is connected to another piston (17") to which the cross head (6) is secured in articulated fashion by means of a ball joint (32).

6. Device according to claim 5, characterized in that a hydraulic unit (37) which supplies hydraulic pressure liquid is arranged on the cylinder (3").

7. Device according to claim 5, characterized in that a hollow body (3') is arranged between the pipe elbow (1) and the cylinder (3") and is a storage container for the hydraulic liquid.

References Cited

UNITED STATES PATENTS

| | | | |
|---|---|---|---|
| 2,428,381 | 10/1947 | Parry | 285—420 X |
| 2,536,602 | 1/1951 | Goett | 285—364 X |
| 2,696,993 | 12/1954 | Buckler | 285—311 X |
| 2,704,679 | 3/1955 | Stilwell | 285—27 X |
| 2,803,473 | 8/1957 | Hohmann | 285—24 X |

FOREIGN PATENTS

| | | |
|---|---|---|
| 960,436 | 3/1957 | Germany. |
| 8,547,763 | 11/1960 | Great Britain. |
| 82,804 | 12/1957 | Norway. |

CARL W. TOMLIN, *Primary Examiner.*

D. W. AROLA, *Assistant Examiner.*

U.S. Cl. X.R.

24—24; 285—93, 317, 320, 364, 420